(12) United States Patent
Raveendran

(10) Patent No.: US 11,823,395 B2
(45) Date of Patent: Nov. 21, 2023

(54) VEHICULAR VISION SYSTEM WITH ROAD CONTOUR DETECTION FEATURE

(71) Applicant: Magna Electronics Inc., Auburn Hills, MI (US)

(72) Inventor: Bishnu Raveendran, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 287 days.

(21) Appl. No.: 17/305,162

(22) Filed: Jul. 1, 2021

(65) Prior Publication Data

US 2022/0005210 A1   Jan. 6, 2022

Related U.S. Application Data

(60) Provisional application No. 62/705,527, filed on Jul. 2, 2020.

(51) Int. Cl.
*G06T 7/246* (2017.01)
*G01C 21/34* (2006.01)
(Continued)

(52) U.S. Cl.
CPC ......... *G06T 7/248* (2017.01); *B60H 1/00742* (2013.01); *B60H 1/00792* (2013.01);
(Continued)

(58) Field of Classification Search
CPC ........... G06T 7/248; G06T 2207/30256; G06T 2207/30261; G06T 2207/30268; G06T 7/73; B60H 1/00742; B60H 1/00792; B60H 1/00985; B60Q 9/00; B60Q 9/002; B60R 1/00; B60R 25/31; B60R 2300/8006; B60R 1/27; B60R 2300/105; B60R 2300/607; G01C 21/28; G01C 21/3461; G01C 21/3602; G06V 20/58; G06V 20/588;
(Continued)

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

FOREIGN PATENT DOCUMENTS

| | | | |
|---|---|---|---|
| CN | 112601686 A | * | 4/2021 |
| CN | 113825979 A | * | 12/2021 |

(Continued)

*Primary Examiner* — Mahendra R Patel
(74) *Attorney, Agent, or Firm* — HONIGMAN LLP

(57) ABSTRACT

A vehicular driving assist system includes a camera disposed at a vehicle equipped with the vehicular driving assist system and viewing forward of the vehicle, the camera capturing image data. An electronic control unit (ECU) includes electronic circuitry and associated software. The electronic circuitry of the ECU includes an image processor for processing image data captured by the camera. The ECU, responsive to processing by the image processor of image data captured by the camera, determines presence of a leading vehicle traveling in front of the equipped vehicle and in the same traffic lane as the equipped vehicle. The ECU, responsive to determining presence of the leading vehicle, determines presence of a pothole in front of the vehicle and in the same traffic lane as the equipped vehicle.

5 Claims, 1 Drawing Sheet

(51) Int. Cl.
*G01C 21/28* (2006.01)
*B60H 1/00* (2006.01)
*B60Q 9/00* (2006.01)
*B60R 1/00* (2022.01)
*B60R 25/31* (2013.01)
*G06V 20/58* (2022.01)
*G06V 20/56* (2022.01)
*G01J 5/00* (2022.01)

(52) U.S. Cl.
CPC ........... *B60H 1/00985* (2013.01); *B60Q 9/00* (2013.01); *B60R 1/00* (2013.01); *B60R 25/31* (2013.01); *G01C 21/28* (2013.01); *G01C 21/3461* (2013.01); *G06V 20/58* (2022.01); *G06V 20/588* (2022.01); *B60R 2300/8006* (2013.01); *G01J 2005/0077* (2013.01); *G06T 2207/30256* (2013.01); *G06T 2207/30261* (2013.01); *G06T 2207/30268* (2013.01)

(58) Field of Classification Search
CPC . G06V 10/00; G06V 20/59; G01J 2005/0077; B60K 2370/167; B60K 2370/176; B60K 35/00
USPC ......................................................... 382/104
See application file for complete search history.

(56) References Cited

U.S. PATENT DOCUMENTS

| | | | |
|---|---|---|---|
| 5,949,331 | A | 9/1999 | Schofield et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,268 | B2 | 2/2004 | Schofield et al. |
| 6,690,354 | B2 | 2/2004 | Sze |
| 6,693,517 | B2 | 2/2004 | McCarthy et al. |
| 6,710,770 | B2 | 3/2004 | Tomasi et al. |
| 6,824,281 | B2 | 11/2004 | Schofield et al. |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,038,577 | B2 | 5/2006 | Pawlicki et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Ratii et al. |
| 7,405,812 | B1 | 7/2008 | Bamji |
| 7,408,627 | B2 | 8/2008 | Bamji et al. |
| 7,480,149 | B2 | 1/2009 | DeWard et al. |
| 7,580,795 | B2 | 8/2009 | McCarthy et al. |
| 7,720,580 | B2 * | 5/2010 | Higgins-Luthman ........................ H04N 25/76 701/28 |
| 7,855,755 | B2 | 12/2010 | Weller et al. |
| 8,013,780 | B2 | 9/2011 | Lynam |
| 8,027,029 | B2 | 9/2011 | Lu et al. |
| 8,256,821 | B2 | 9/2012 | Lawlor et al. |
| 9,036,026 | B2 | 5/2015 | Dellantoni et al. |
| 9,126,525 | B2 | 9/2015 | Lynam et al. |
| 9,146,898 | B2 | 9/2015 | Ihlenburg et al. |
| 9,360,323 | B2 * | 6/2016 | Grokop ................ G01C 21/165 |
| 9,418,554 | B2 * | 8/2016 | Velusamy ............ G08G 1/0112 |
| 9,487,159 | B2 | 11/2016 | Achenbach |
| 9,575,160 | B1 | 2/2017 | Davis et al. |
| 9,596,387 | B2 | 3/2017 | Achenbach et al. |
| 9,599,702 | B1 | 3/2017 | Bordes et al. |
| 9,674,490 | B2 * | 6/2017 | Koravadi ................ B60R 11/04 |
| 9,689,967 | B1 | 6/2017 | Stark et al. |
| 9,753,121 | B1 | 9/2017 | Davis et al. |
| 9,857,795 | B2 * | 1/2018 | Gupta ................... B60W 30/20 |
| 9,871,971 | B2 | 1/2018 | Wang et al. |
| 9,896,039 | B2 | 2/2018 | Achenbach et al. |
| 9,900,490 | B2 | 2/2018 | Ihlenburg et al. |
| 10,071,687 | B2 | 9/2018 | Ihlenburg et al. |
| 10,099,614 | B2 | 10/2018 | Diessner |
| 10,163,018 | B1 * | 12/2018 | Chan ....................... G06F 16/50 |
| 10,452,069 | B2 * | 10/2019 | Stein ...................... G08G 1/167 |
| 10,509,972 | B2 * | 12/2019 | Higgins-Luthman ....................... G06V 20/58 |
| 10,532,736 | B2 * | 1/2020 | Asakura ................ B60W 10/20 |
| 10,549,690 | B1 * | 2/2020 | Englander ............. B60Q 9/008 |
| 10,735,695 | B2 * | 8/2020 | Schofield ................ B60R 11/04 |
| 11,560,131 | B2 * | 1/2023 | Sengupta ................ B60R 11/04 |
| 11,661,065 | B2 * | 5/2023 | Hayakawa .......... B60W 60/001 701/26 |
| 2009/0295181 | A1 | 12/2009 | Lawlor et al. |
| 2012/0062743 | A1 | 3/2012 | Lynam et al. |
| 2012/0218412 | A1 | 8/2012 | Dellantoni et al. |
| 2013/0222592 | A1 | 8/2013 | Gieseke |
| 2014/0160284 | A1 | 6/2014 | Achenbach et al. |
| 2014/0218529 | A1 | 8/2014 | Mahmoud et al. |
| 2014/0226012 | A1 | 8/2014 | Achenbach |
| 2014/0375476 | A1 | 12/2014 | Johnson et al. |
| 2015/0015713 | A1 | 1/2015 | Wang et al. |
| 2015/0124096 | A1 | 5/2015 | Koravadi |
| 2015/0153735 | A1 * | 6/2015 | Clarke ................ B60W 40/076 701/301 |
| 2015/0158499 | A1 | 6/2015 | Koravadi |
| 2015/0251599 | A1 | 9/2015 | Koravadi |
| 2015/0327398 | A1 | 11/2015 | Achenbach et al. |
| 2015/0352953 | A1 | 12/2015 | Koravadi |
| 2016/0036917 | A1 | 2/2016 | Koravadi et al. |
| 2016/0132705 | A1 * | 5/2016 | Kovarik ............. G06K 7/10376 340/10.3 |
| 2016/0210853 | A1 | 7/2016 | Koravadi |
| 2016/0236689 | A1 * | 8/2016 | Pettersson ............... B60T 8/172 |
| 2017/0136842 | A1 * | 5/2017 | Anderson ............ A61B 5/4023 |
| 2019/0054918 | A1 * | 2/2019 | Lu ...................... B62D 15/0295 |
| 2019/0170511 | A1 * | 6/2019 | Maucher ................ G01S 17/931 |
| 2019/0351907 | A1 * | 11/2019 | Pawlicki ................ G06V 20/58 |
| 2019/0369637 | A1 * | 12/2019 | Shalev-Shwartz ..... G06V 20/56 |
| 2020/0353915 | A1 * | 11/2020 | Rohde ............... B60W 30/0956 |

FOREIGN PATENT DOCUMENTS

| | | | |
|---|---|---|---|
| EP | 3159853 | A1 * | 4/2017 |
| WO | WO-2004045892 | A1 * | 6/2004 |
| WO | WO-2020243484 | A1 * | 12/2020 |

* cited by examiner

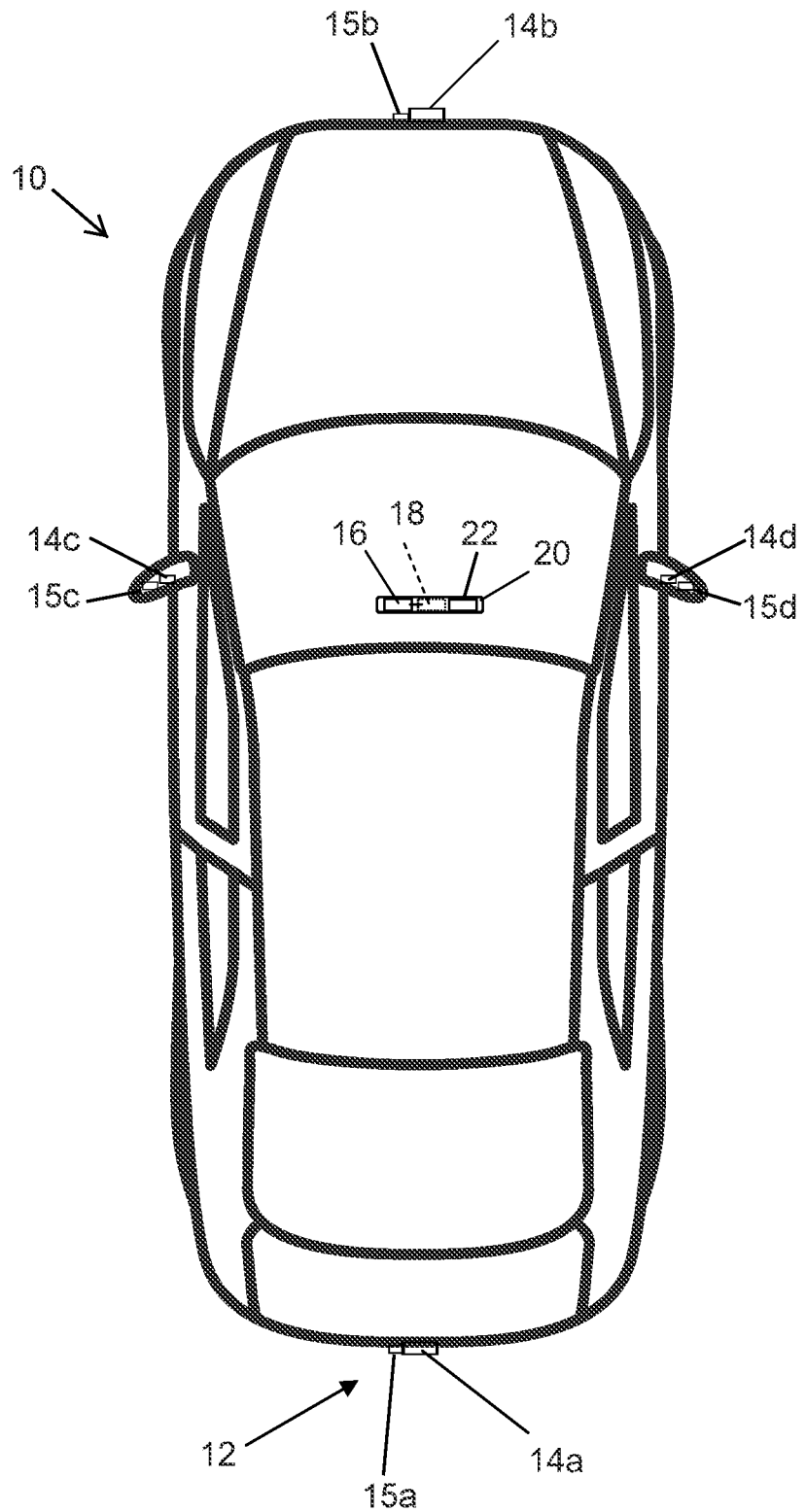

VEHICULAR VISION SYSTEM WITH ROAD CONTOUR DETECTION FEATURE

CROSS REFERENCE TO RELATED APPLICATION

The present application claims the filing benefits of U.S. provisional application Ser. No. 62/705,527, filed Jul. 2, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that utilizes one or more cameras (preferably one or more CMOS cameras) to capture image data representative of images exterior of the vehicle, and provides a control including electronic circuitry and associated software. The electronic circuitry of the control includes an image processor for processing image data captured by the camera. The control, responsive to processing by the image processor of image data captured by the camera, detects a vehicle traveling in front of the equipped vehicle and in the same traffic lane as the equipped vehicle. The control, responsive to detecting the vehicle in front of the equipped vehicle, detects presence of a pothole in front of the vehicle and in the same traffic lane as the equipped vehicle.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a vision system that incorporates cameras in accordance with the present invention.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an imaging system or driver assist system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, the system 12 includes at least one sensor 15, such as a rearward facing radar sensor unit 15a (and the system may optionally include multiple exterior facing sensors, such as a forward facing sensor 15b at the front of the vehicle, and a sideward/rearward facing sensor 15c, 15d at respective sides of the vehicle), which sense regions exterior of the vehicle. Optionally, the system 12 includes at least one interior viewing imaging sensor or camera 22, which may be disposed at and behind the windshield of the vehicle and viewing the interior of the vehicle (such as at an interior rearview mirror assembly 20) so as to capture image data representative of the driver and/or passengers in the vehicle.

The vision system 12 includes a control or electronic control unit (ECU) 18 having electronic circuitry and associated software, with the electronic circuitry including a data processor that is operable to process captured sensor data and/or an image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at the interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The ECU 18 processes captured sensor data and/or captured image data to provide a function of the system 12 and/or communicate the processed data or a signal generated based on the processed data to a system of the vehicle.

In an aspect of the present invention, captured image data may be processed for a vision system that performs pothole detection using a front mounted or forward viewing camera (such as a camera mounted at the front bumper or at the in-cabin side of the windshield of the vehicle) monitoring the wheel suspension of a vehicle traveling in front of the equipped vehicle. The forward viewing camera 14b has a field of view that includes at least a portion of the road in front of the equipped vehicle 10. The image processor at the ECU 18 of the vision system 12 processes image data captured by the camera and detects a vehicle that is travelling in front of the equipped vehicle and in the same traffic lane as the equipped vehicle. The system determines when a pot hole is present in the lane that the equipped vehicle is travelling in by determining rapid upward and/or downward movement of the leading vehicle (or portion of the vehicle, such as one of its tires) travelling in front of the equipped vehicle (i.e., movement from the vehicle hitting a pothole).

The system may (via processing of image data captured by the forward viewing camera) determine movement of one or more wheels of the leading vehicle. For example, if either rear wheel of the leading vehicle enters a pot hole, the wheel will rapidly move downward in the captured image data, then rapidly move upward as the wheel exits the pothole. The system may include a threshold amount of movement and/or a threshold rate of movement that must be exceeded prior to the system determining presence of a pothole. For example, the system determines presence of a pothole ahead responsive to determination that a wheel of a leading vehicle moves at least a threshold amount upward and/or downward over a given period of time. Optionally, the system may include a relative amount of movement and/or a relative rate of movement that must be exceeded prior to the system determining presence of a pothole. For example, the system may determine an average amount of upward and/or downward movement of a wheel of a leading vehicle while the equipped vehicle travels along the road behind the leading vehicle and determine presence of a pothole when the upward and/or downward movement of the wheel exceeds a range based on the determined average amount. The system may classify an object based on the relative movement of a portion of the leading vehicle. For example, rapid movement in a downward direction followed by rapid movement in the other (upward) direction may be classified as a pothole while the opposite movement pattern (upward movement followed by downward movement) may be classified as a speed bump. Further, movement in one direction without rapid movement in the other direction may be classified as a ramp. Thus, the system may account for bumpy and/or dirt roads, speed bumps, ramps, and other objects without false determinations of potholes. The system may also monitor other portions of the vehicle instead of or in addition to the tires (e.g., a bumper, etc.). The system may then communicate a determination of a pothole to another system of the vehicle, such as a suspension system (such as to stiffen or loosen the suspension as appropriate) or a driving assist system (which may generate an alert to a driver of the vehicle or may control steering and/or braking of the vehicle to avoid the pothole or mitigate impact with the pothole).

In another aspect of the present invention, the interior viewing imaging sensor or camera 22 may comprise a thermal camera and data captured via the thermal camera may be processed for a climate control system that performs automatic climate control. In this example, the system includes one or more thermal cameras disposed within the cabin of the vehicle with fields of view that include the driver and/or passengers of the vehicle. Optionally, the one or more thermal cameras may be disposed within the cabin of the vehicle with fields of view that include one or more climate zones of the vehicle. For example, the cameras may have fields of view that include the foot wells of the cabin, an area corresponding to the seats (i.e., torso region of an occupant), and the head region. The cameras may be disposed at any number of locations within the vehicle (e.g., at the dash, at the headliner, etc.). The thermal camera(s) capture thermal image data that, when processed by the ECU, may provide information of the temperature of a climate zone or of a particular area of the body of one or more occupants of the vehicle, for example that the determined temperature of the area of the body is cooler than other areas of the occupant. For example, a foot of an occupant may be cooler than other portions or the rest of the body of the same occupant.

This information may be used to control a heating, ventilation, and air conditioning (HVAC) system of the vehicle. The climate control system may automatically adjust heating and/or cooling and/or ventilation throughput to various climate control zones within the vehicle to better distribute the temperature of the occupants. For example, when the feet of an occupant are colder than the rest of his or her body and the heat is enabled (e.g., a temperature outside the car is lower than a temperature within the car), the system may redirect warmer air towards the feet of the occupant. The system may optionally capture and process the thermal imaging data to concentrate the heating/cooling/ventilation to only areas where people are present (e.g., disable vents that are directed toward seats that are empty). Optionally, the thermal cameras may be positioned within the vehicle to sense temperatures of body parts and/or climate zones of the interior cabin of the vehicle that correspond to the climate control capabilities of the vehicle. For example, the climate control system may be configured to provide discrete climate control to defined climate zones and the thermal cameras may similarly be positioned to capture thermal image data of the regions and/or body parts of the occupant in the climate zones. Thus, if the system adjusts the HVAC system of the vehicle, it may do so based on a determination of the temperatures in the defined climate zones.

In another aspect of the present invention, captured image data may be processed for a vision system, which includes one or more cameras with exterior fields of view, to detect a hazard (e.g., an animal such as a snake or other potentially harmful and not readily viewable animal) in order to warn an occupant of the vehicle prior to the occupant exiting the vehicle and potentially coming in contact with the hazard. The camera(s) may include accent lighting (e.g., an infrared or near infrared light emitting diode (LED) or the like) to improve image capture capabilities in low-light conditions. The camera may be a normal vision camera with additional lighting (e.g., LED lighting) that is mounted to, for example, the side skirt or side door exterior rearview mirror or underneath the vehicle. Optionally, the camera and additional lighting may be disposed remote from each other and/or included in separate components at the vehicle. For example, the camera may be a rearward and side viewing camera at the exterior rearview mirror (such as cameras 14c, 14d) and the lighting may be part of a ground illumination unit at the side door of the vehicle.

When the vehicle comes to a stop or when the vehicle is placed in park (or any other appropriate triggering event occurs), image data of the vehicle's surrounding is captured by the camera(s) and the captured image data is processed (e.g., via an artificial intelligence algorithm such as a neural network) to detect the presence of potential hazards such as mud or a puddle of water or ice or hazardous animals (e.g., a snake) in the vicinity of the vehicle. The system may include other types of imaging sensors (e.g., infrared cameras) to detect potential hazards. Optionally, the system may utilize non-imaging sensors (such as radar sensors 15) to detect potential hazards and/or objects in the vicinity of the vehicle and the system may utilize the non-imaging sensors in conjunction with the imaging sensors at the vehicle. For example, a radar detector at the equipped vehicle may be used to detect motion near the side of the vehicle, which may trigger an imaging sensor to capture and process image data representative of the area at which the motion was detected.

The system may notify the occupant with an audible alert or a visual alert (e.g., via a notification on a display, flashing lights, etc.). Optionally, the system may, responsive to determination of a hazard, display video images at the display device 16 generated from the captured image data to show images of the hazard to the occupant of the vehicle. The system may alert a person who is attempting to unlock or otherwise enter the vehicle as well. For example the system may determine a presence of a person approaching the vehicle and attempting to enter the vehicle (e.g., via a key fob, sensors in a door handle or lock, etc.) and visually or audibly alert the person to a presence of a nearby hazard (such as a hazard between the approaching person and the side door of the vehicle).

In another aspect of the present invention, captured sensor data may be processed for a vision system that includes rideshare customer health profiling capabilities. In this example, the vision system includes one or more thermal cameras disposed at the vehicle with a field of view exterior of the vehicle. The field of view may include an area outside one or more of the doors of the vehicle. For example, the camera may be disposed at or near one or more doors of the vehicle (such as camera 14d) and/or a rail mounted camera (such as mounted to a rail at the roof of the vehicle). Using thermal images captured by the thermal camera, the system and/or an operator of a vehicle may determine a temperature of a potential passenger of the vehicle. The system and/or operator may further base a decision on whether to allow entry into the vehicle based on the thermal image data. For example, when the potential passenger appears to have a fever (e.g., a higher than normal temperature), the system and/or driver may decline to allow entry. In a fully autonomous vehicle, the system alone may determine whether the passenger should be allowed entry. When the vehicle is operated by an occupant, the system may notify the occupant to allow the driver to make the decision regarding the approaching potential passenger.

In another aspect of the present invention, captured sensor data may be processed for a vision system to determine information related to the terrain in the vicinity of the vehicle. In this example, the vision system includes one or more sensors disposed at the vehicle with fields of sensing exterior of the vehicle. For example, the sensor(s) may be placed at a side skirt of the vehicle or behind the rearview mirror of the vehicle. The sensor(s) capture sensor data that, when processed by the controller, provide an occupant of the vehicle with terrain information. For example, the sensors may be radar sensors 15 that determine a topography of the terrain in the immediate vicinity of the vehicle to determine if surfaces are uneven. The system may notify and/or warn the occupant of the determined topography. For example, when the terrain appears to pose a potential hazard to the occupant (e.g., a slope or objects in the way), the system may audibly or visually alert the occupant. Optionally, the system may provide the alert only when presence of the potential hazard is determined via processing of the captured sensor data. The system may display an image of the topography on a display disposed within the vehicle.

Optionally, the system may capture sensor data and process the captured sensor data to determine the topography of the terrain in the vicinity of the vehicle responsive to a condition of the vehicle, such as the vehicle being shifted into a parking gear or the vehicle travelling below a threshold speed. For example, the system may determine that the vehicle is parked (such as after a parking maneuver or after the vehicle is shifted into a parking gear) and capture sensor data to communicate determined topography to an occupant of the vehicle so the occupant may be notified as to the terrain prior to stepping out of the vehicle. The system may capture sensor data while the vehicle is travelling under a threshold speed (such as while performing off road maneuvers) to provide terrain information to the driver of the vehicle while travelling under the threshold speed.

In another aspect of the present invention, captured sensor data may be processed for a driving assist system that determines an optimal navigation route for a vehicle to travel from a starting location to a destination. The system creates and maintains a database that includes a road quality index of roads between the starting location and the destination. The database may be crowdsourced and/or generated from data captured and processed by the equipped vehicle. The road quality index may be introduced as an additional factor in determining an optimal navigation route to the destination in addition to other potential factors such as, for example, distance, speed, tolls, etc.

The road quality index may be measured by a vehicle travelling on the respective road by measuring the instantaneous suspension pressure of one or more wheels of the vehicle (either individually or an average). The system may also monitor an axle mounted gyroscope that provides pitch, yaw, and/or roll information regarding the vehicle. Optionally, the system may, via processing of image data captured by one or more cameras 14 of the vehicle, determine the instantaneous yaw, pitch, and roll of the vehicle. Captured image data may also be processed to determine a type of road surface (e.g., dirt, concrete, asphalt, etc.) and/or condition of the road (e.g., presence of potholes, traffic, construction, or other hazards). Optionally, the road quality index may be based at least in part on the pothole detection of the vision system of the equipped vehicle.

The data captured by the vision system and/or gyroscope and/or any other suitable sensor at the equipped vehicle may be processed individually or collectively to determine the road quality index. For example, excessive pressure increases of the suspension system or excessive pitching, rolling, or yawing of the vehicle may indicate a poor road quality index as this may be indicative of uneven surfaces and/or potholes. The system may also include a global position system (GPS) sensor, such as a high-precision GPS sensor to track the location of the vehicle to determine which road to attribute the road quality index to.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476;

US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,126,525 and/or 9,041,806, and/or U.S. Publication Nos. US-2015-0022664 and/or US-2012-0162427, which are hereby incorporated herein by reference in their entireties.

The system may include a camera having a field of view interior of the vehicle and that may include at least a head region of a driver or occupants of the vehicle and may utilize aspects of driver monitoring systems and/or head and face direction and position tracking systems and/or eye tracking systems and/or gesture recognition systems that may utilize aspects of the systems described in U.S. Pat. Nos. 10,065,574; 10,017,114; 9,405,120 and/or 7,914,187, and/or U.S. Publication Nos. US-2020-0202151; US-2020-0143560; US-2020-0320320; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/301,853, filed Apr. 16, 2021, and/or Ser. No. 17/249,937, filed Mar. 19, 2021, and/or U.S. provisional applications, Ser. No. 63/200,451, filed Mar. 8, 2021, Ser. No. 63/200,315, filed Mar. 1, 2021, Ser. No. 63/200,003, filed Feb. 9, 2021, Ser. No. 63/199,918, filed Feb. 3, 2021, Ser. No. 63/198,372, filed Oct. 14, 2020, and/or Ser. No. 62/706,707, filed Sep. 4, 2020, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
    a camera disposed at a vehicle equipped with the vehicular driving assist system and viewing forward of the vehicle, the camera capturing image data;
    an electronic control unit (ECU) comprising electronic circuitry and associated software instruction;
    wherein the electronic circuitry of the ECU comprises an image processor for processing image data captured by the camera;
    wherein the ECU, responsive to processing by the image processor of image data captured by the camera, determines presence of a leading vehicle traveling in front of the equipped vehicle and in the same traffic lane as the equipped vehicle;
    wherein the ECU, responsive to determining presence of the leading vehicle in front of the equipped vehicle, determines vertical movement of a portion of the determined leading vehicle in front of the equipped vehicle; and
    wherein the ECU, responsive to the determined vertical movement of the portion of the determined leading vehicle, (a) determines presence of a pothole in front of the vehicle and in the same traffic lane as the equipped vehicle and (b) at least one selected from the group consisting of (i) generates an alert to a driver of the vehicle, (ii) controls steering of the vehicle to mitigate impact with the determined pothole and (iii) controls braking of the vehicle to mitigate impact with the determined pothole.

2. The vehicular driving assist system of claim 1, wherein the portion of the determined leading vehicle is at least one wheel of the determined leading vehicle.

3. The vehicular driving assist system of claim 1, wherein the ECU determines presence of the pothole when the determined vertical movement of the portion of the determined leading vehicle in front of the equipped vehicle is greater than a threshold amount of vertical movement.

4. The vehicular driving assist system of claim 1, wherein the ECU determines presence of the pothole in front of the vehicle based on a rate of the determined vertical movement of the portion of the determined leading vehicle.

5. The vehicular driving assist system of claim 4, wherein the ECU determines presence of the pothole when the rate is above a threshold rate.

* * * * *